(12) United States Patent
McMillan

(10) Patent No.: US 7,513,734 B2
(45) Date of Patent: Apr. 7, 2009

(54) GAS TURBINE ENGINE BLADE CONTAINMENT SYSTEM AND A LAMINATE MATERIAL

(75) Inventor: Alison Jane McMillan, Uttoxeter (GB)

(73) Assignee: Rolls-Royce PLC, London (GB)

( * ) Notice: Subject to any disclaimer, the term of this patent is extended or adjusted under 35 U.S.C. 154(b) by 496 days.

(21) Appl. No.: 11/258,876

(22) Filed: Oct. 27, 2005

(65) Prior Publication Data

US 2006/0210391 A1 Sep. 21, 2006

(30) Foreign Application Priority Data

Nov. 20, 2004 (GB) ................... 0425595.6

(51) Int. Cl.
*F01B 25/16* (2006.01)
(52) U.S. Cl. .............. 415/9; 415/173.3; 415/173.4
(58) Field of Classification Search .......... 5/720; 415/9, 173.1, 173.3, 173.4, 214.1; 428/68, 428/71, 76, 222, 371

See application file for complete search history.

(56) References Cited

U.S. PATENT DOCUMENTS

| | | | | |
|---|---|---|---|---|
| 1,462,890 A | * | 7/1923 | Birchard | ............ 415/204 |
| 3,449,199 A | * | 6/1969 | Mead | ............ 428/105 |
| 3,544,232 A | * | 12/1970 | Zerlauth | ............ 415/214.1 |
| 3,562,082 A | * | 2/1971 | Van Buskirk | ............ 428/222 |
| 4,208,777 A | * | 6/1980 | Walsh et al. | ............ 29/418 |
| 4,639,388 A | * | 1/1987 | Ainsworth et al. | ............ 428/117 |
| 5,438,718 A | * | 8/1995 | Kelly et al. | ............ 5/720 |
| 6,244,819 B1 | * | 6/2001 | Voorhees | ............ 415/213.1 |
| 6,439,842 B1 | * | 8/2002 | Toomey et al. | ............ 415/162 |
| 6,641,907 B1 | * | 11/2003 | Merrill et al. | ............ 428/313.9 |

FOREIGN PATENT DOCUMENTS

| | | |
|---|---|---|
| DE | 196 07 025 A1 | 8/1997 |
| EP | 0 728 541 A1 | 8/1996 |
| GB | 2 281 941 A | 3/1995 |
| GB | 2 362 432 A | 11/2001 |
| SU | 1483061 A1 | 5/1989 |

* cited by examiner

*Primary Examiner*—Edward Look
*Assistant Examiner*—Aaron R Eastman
(74) *Attorney, Agent, or Firm*—Oliff & Berridge, PLC

(57) ABSTRACT

A gas turbine engine blade containment system that includes a laminate material including first and second layers. The first layer is an inner layer within the second layer. The second layer includes a plurality of resiliently compressive springs extending transversely relative to the first layer, and each spring is encased in a crushable support material. The first layer includes a hard material to blunt a broken blade. The springs in the second layer are compressed and the crushable support material of the second layer is crushed to absorb energy of a broken blade.

28 Claims, 8 Drawing Sheets

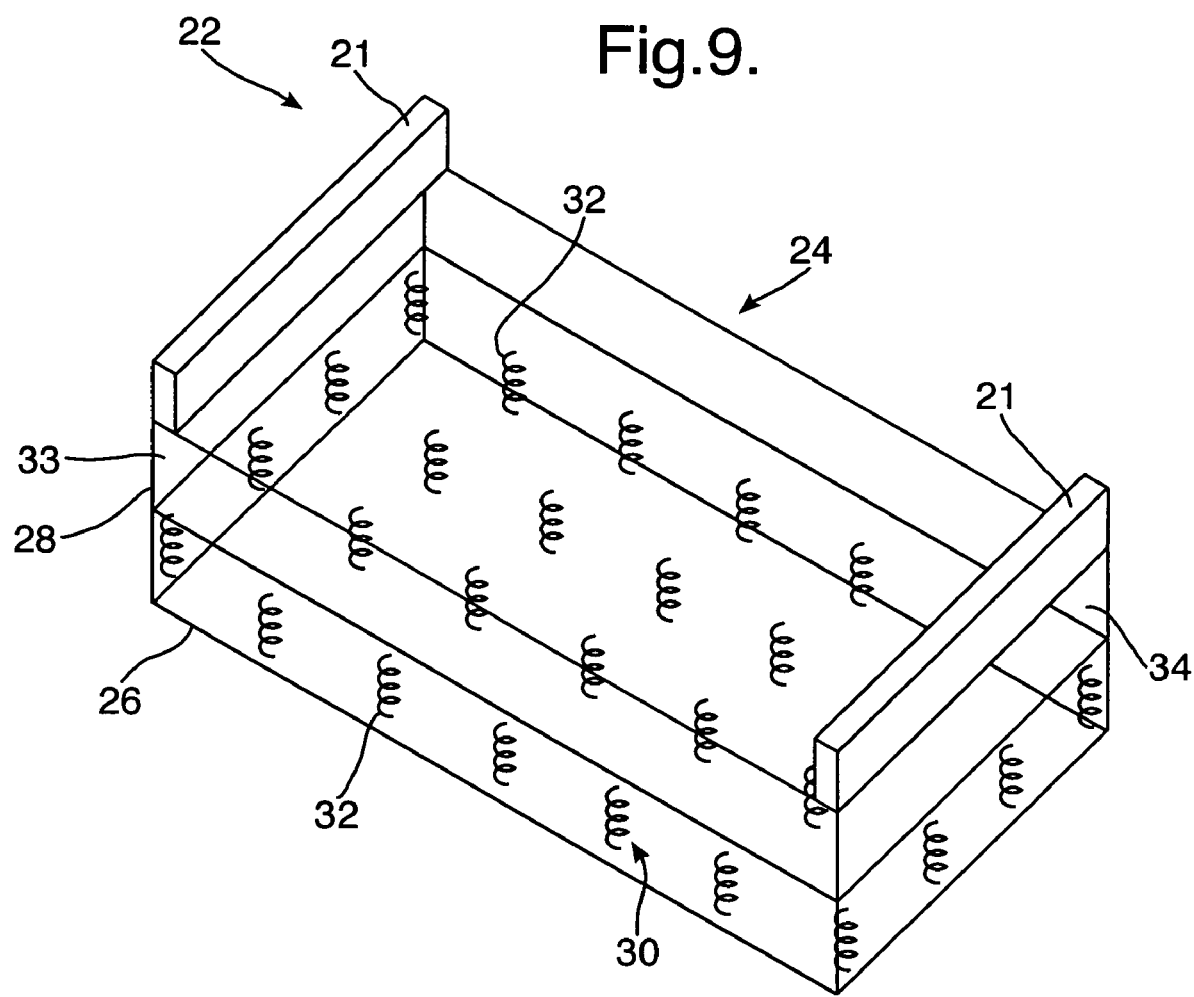

GAS TURBINE ENGINE BLADE CONTAINMENT SYSTEM AND A LAMINATE MATERIAL

This invention relates to laminate materials, particularly, but not exclusively, the invention relates to laminate materials for use in containment systems of layered containment systems. Specifically, but not exclusively, the invention relates to laminate materials for use in gas turbine engine blade containment systems.

The casings of gas turbine engines are manufactured to absorb energy from any blades or other components which break off from the spinning discs within the engine. One example of casing is one formed from solid ductile material. However, such casings have a disadvantage of being heavy and requiring a large thickness.

According to one aspect of this invention, there is provided a gas turbine engine blade containment system including a laminate material, the laminate material comprising first and second layers, wherein the second layer being arranged on the first layer, the second layer comprises a plurality of deformable members extending transversely relative to the first layer, each deformable member being encased in a crushable support material, the deformable members comprise springs, the first layer being an inner layer within the second layer.

In one embodiment, the crushable support material may comprise a matrix encasing the plurality of deformable members. The matrix may extend across substantially the whole of the second layer. In another embodiment, each deformable member may be encased in a discrete encasing member. The support material may be a polymeric material, a low density metal, or a metal foam.

The crushable support material may comprise a plurality of hollow elements embedded in a polymeric material. The hollow elements may comprise spheres of a breakable material, such as glass or rigid plastics material. Preferably, the hollow elements are filled with a gas such as air or argon. Alternatively, the crushable support material may comprise a foamed polymeric material. The foamed polymeric material may comprise a polymeric material having a plurality of cells. The cells may be open or closed. The polymeric material may comprise a resin material.

The springs may be coil springs and/or two-dimensional springs. The coil springs may comprise a helix, conveniently a single helix, or a multiple helix, or may be of rectangular form. Where the deformable members comprise coil springs, and the support material includes hollow elements, the hollow elements may be arranged within the coils of the springs.

The laminate material may comprise a third layer arranged over the second layer, such that the second layer is provided between the first layer and the third layer.

According to another aspect of this invention, there is provided a laminate material as described above.

According to a further aspect of this invention, there is provided a gas turbine engine incorporating a casing as described above.

Embodiments of the invention will now be described by way of example only, with reference to the accompanying drawings, in which:

FIG. 9 is a diagrammatic view of an alternative containment system for use in a casing of a gas turbine engine.

Figure 1:
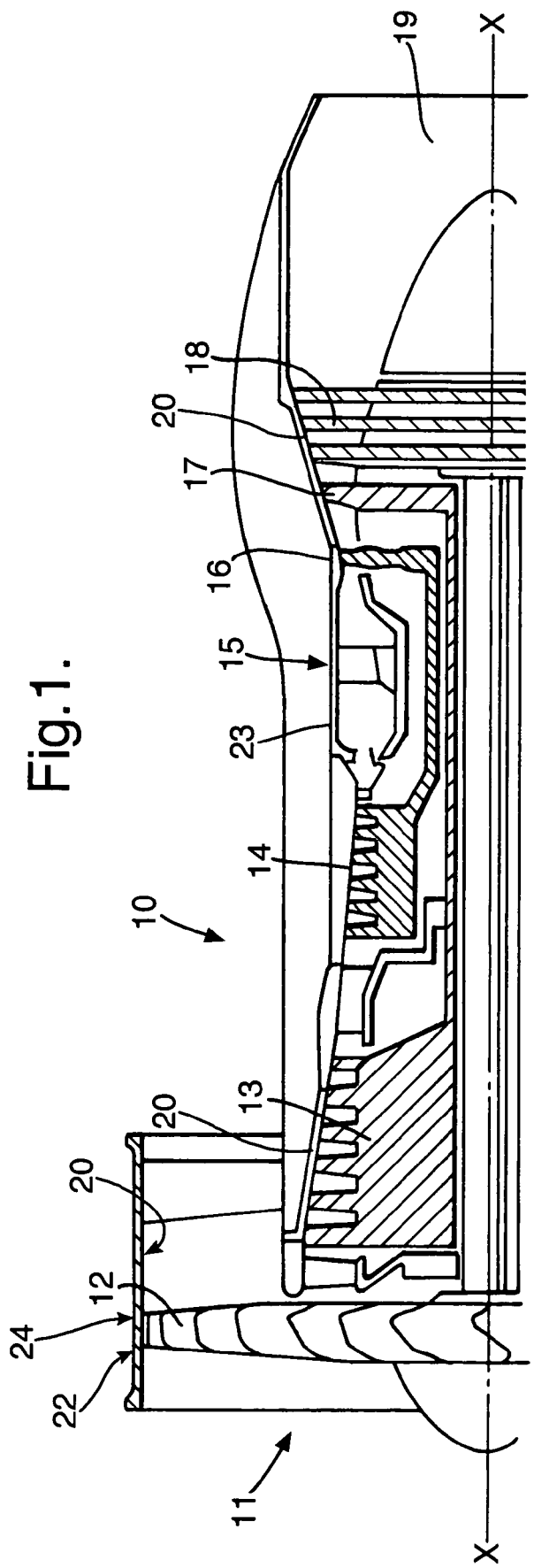
FIG. 1 is a cross-sectional view of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, and intermediate pressure turbine 17 and a low pressure turbine 18, and an exhaust nozzle 19.

The gas turbine engine 10 for an aircraft operates in a conventional manner so that air entering the intake 11 is accelerated by the fan 12 which produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts. The fan 12, the compressors 13, 14 and the turbines, 16, 17, 18 are surrounded by casings designated generally by the numeral 20.

It is a certification requirement of gas turbine engines that, should components such as fan blades, compressor blades, turbine blades or pieces thereof break away from the disc securing them to the shafts, these pieces must be contained. Should this happen the high energy of the blade or blade piece would cause it to strike the inside of the casing 20 of the gas turbine engine 10. It is necessary to ensure that the energy of the blades is absorbed by the casing 20 and hence in one embodiment described below with reference to FIG. 2, the casing 20 comprises a containment system 22 (shown in more detail in FIG. 2) formed of a three layer laminate material 24.

Figure 2:
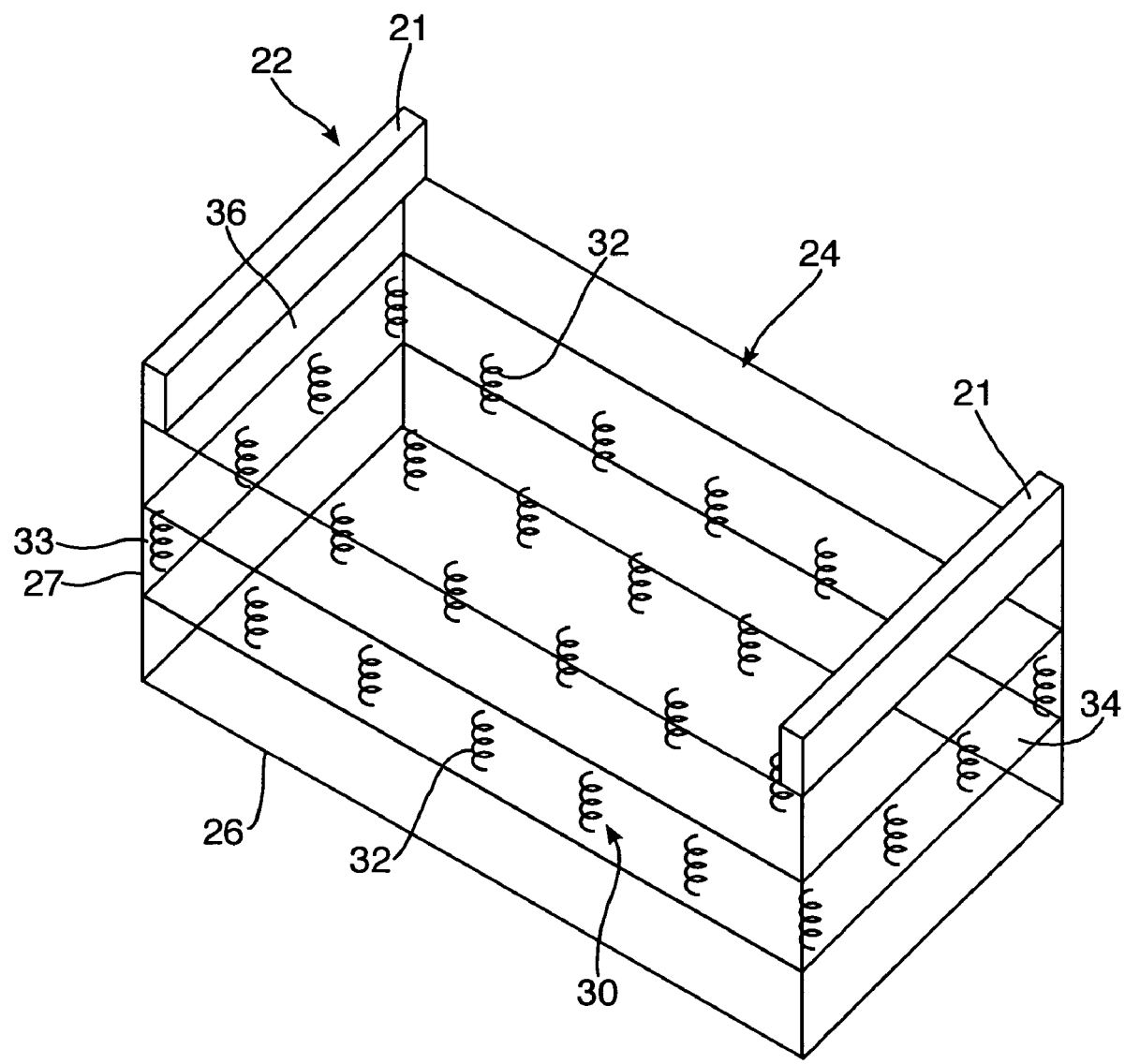
FIG. 2 is a diagrammatic view of a containment system for use in a casing of a gas turbine engine.

In the embodiment shown in FIG. 2, a first layer 26, which is an inner layer, is formed of a hard material intended to blunt the approach of the broken blade to spread the load thereon.

The laminate material 24 also comprises a second layer 28, arranged on the first layer 26. The second layer 28 comprises a plurality of deformable members 30 in the form of coil springs 32. The springs 32 are embedded in a matrix 33 of a support material 34. The support material 34 can be polymeric foam material, a metal foam material, or a polymeric material incorporating hollow elements 38 such as beads or spheres containing air or other gas such as argon (see FIG. 4).

The laminate material 24 comprises a third layer 36, which is an outer layer, arranged on the second layer 28 and which is formed of a rigid material to maintain structural integrity and function. A suitable material could be steel or titanium. The outer layer 36 constitutes the outer casing member and is provided with flanges, or other suitable means, shown schematically at 21 to secure the containment system 22 to adjacent containment systems 22 to provide the casing 20, or to secure the containment system 22 to other casings.

The casing 20 is generally cylindrical, or frustoconical, and is arranged substantially coaxially around the fan 12, the compressors 13, 14 or the turbines 16, 17 and 18.

The first and second layers 26 and 28 are therefore arranged substantially coaxially within the third layer 36, or casing 20.

It is to be noted that the coil springs 32 in the second layer 28 are arranged such that the axes of the coil springs 32 are arranged substantially perpendicularly to the first layer 26 and substantially perpendicularly to the third layer 36, or casing 20. The axes of the coil springs 32 are therefore arranged substantially radially relative to the axis of the casing 20 and hence the axis of rotation of the fan 12, compressors 13, 14 and turbines 16, 17 and 18. The coil springs 32 therefore extend in a direction transverse to the first layer 26 and the third layer 36, or casing 20.

As the broken blade, generally referred to as an impactor, strikes the first layer 26, the impactor is blunted. Subsequently, the impactor rotates and there is then a further impact event when the blade root strikes the casing. Typically, this further impact can cause more damage than the initial impact. The impactor passes into the second layer 28. As the impactor enters the second layer 28, the springs 32 are deformed by being compressed by the force supplied thereto by the impactor and, at the same time, the support material 34 is crushed thereby also absorbing the energy of impact.

In the event that the energy of impact is sufficiently large, after passing through the second layer 28, the impactor strikes the third layer 36, where the impactor halts and is thus prevented from passing out of the containment system 22. This is the ultimate load for which the containment system 22 is designed.

Referring to FIGS. 3 to 6, there are shown examples of several embodiments of one of the springs 32 embedded in the support material 34. In the embodiment shown in FIG. 3, the support material 34 is formed of a foamed polymeric material, a metal foam or a low density metal.

As the impactor strikes the second layer 28, the spring 32 is compressed and the support material 34 is crushed.

Figure 4:
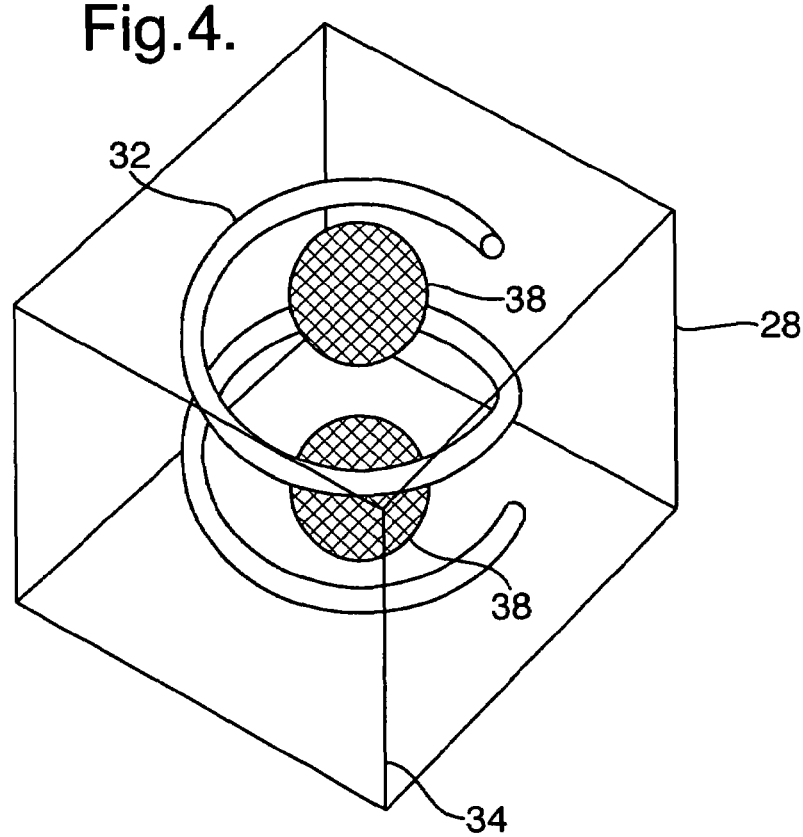
FIG. 4 is a view similar to FIG. 3 of a further embodiment of a deformable member embedded in a support material.

FIG. 4 shows an embodiment in which the support material 34 incorporates a plurality of hollow spherical elements 38 formed of glass or rigid plastics material, and filled with a suitable gas, such as argon. The hollow elements 38 can be distributed randomly about the support material 34, or can be arranged, as shown in FIG. 4, within the helical coils of the spring 32. The provision of the hollow elements 38 allows the support material 34 to be crushed when it is struck by the impactor.

Figure 3:
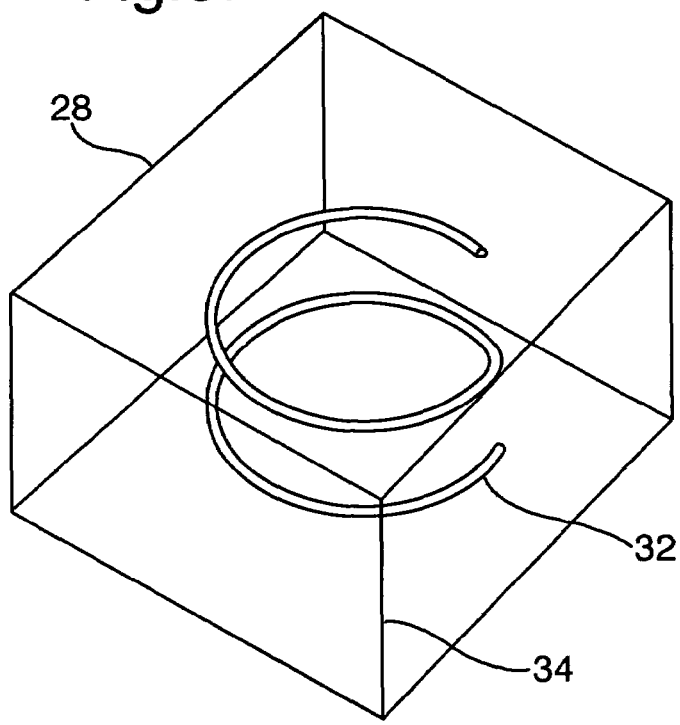
FIG. 3 is a perspective view of a deformable member embedded in a support material.
Figure 5:
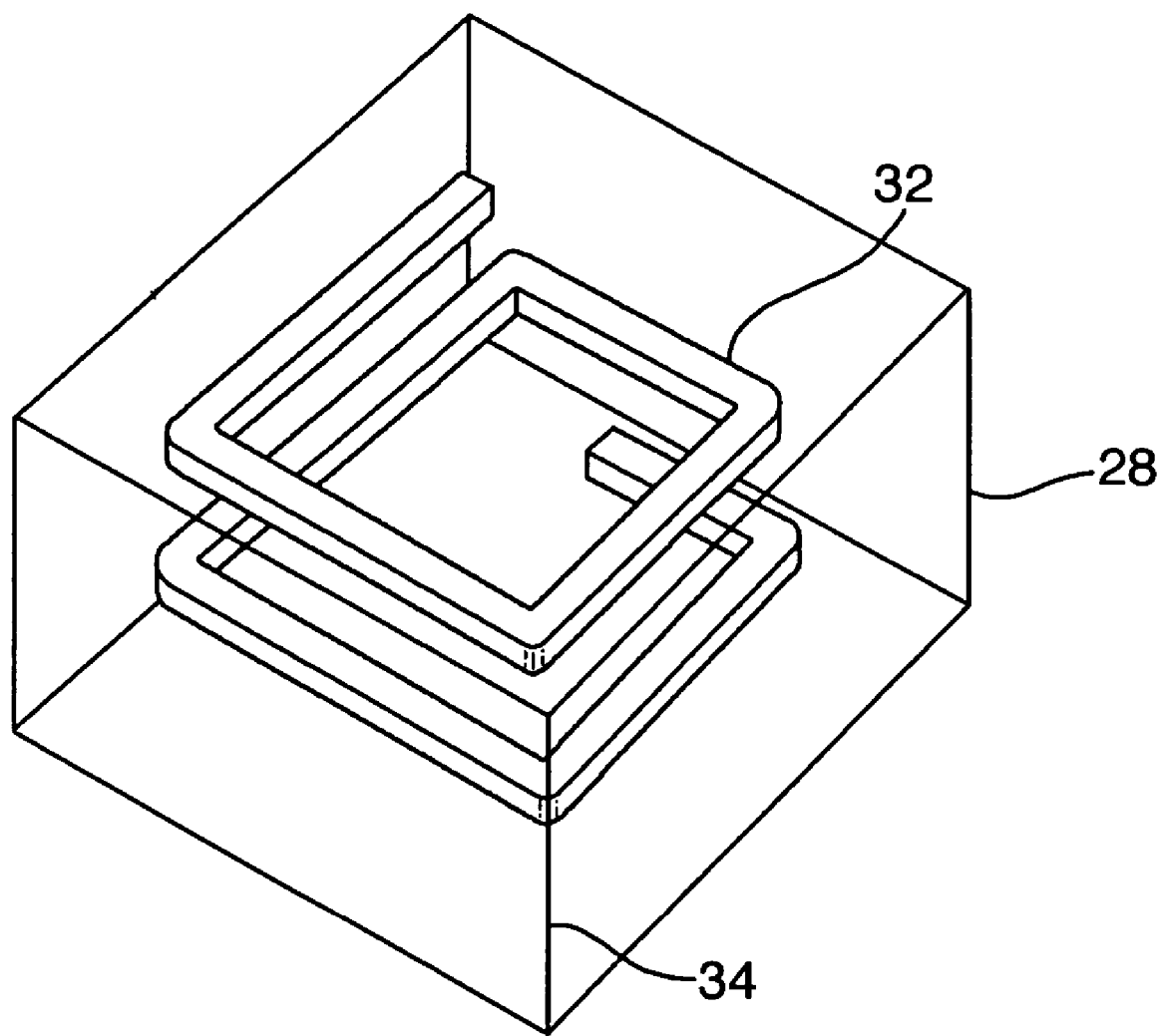
FIG. 5 is a view similar to FIG. 3 of another embodiment of deformable member embedded in a support material.

Referring to FIG. 5, there is shown an embodiment which is similar to the embodiment shown in FIG. 3, in which the spring 32 is of a rectangular configuration. Although not shown in FIG. 5, the support material 34 could incorporate hollow members similar to those shown in FIG. 4.

Figure 6:
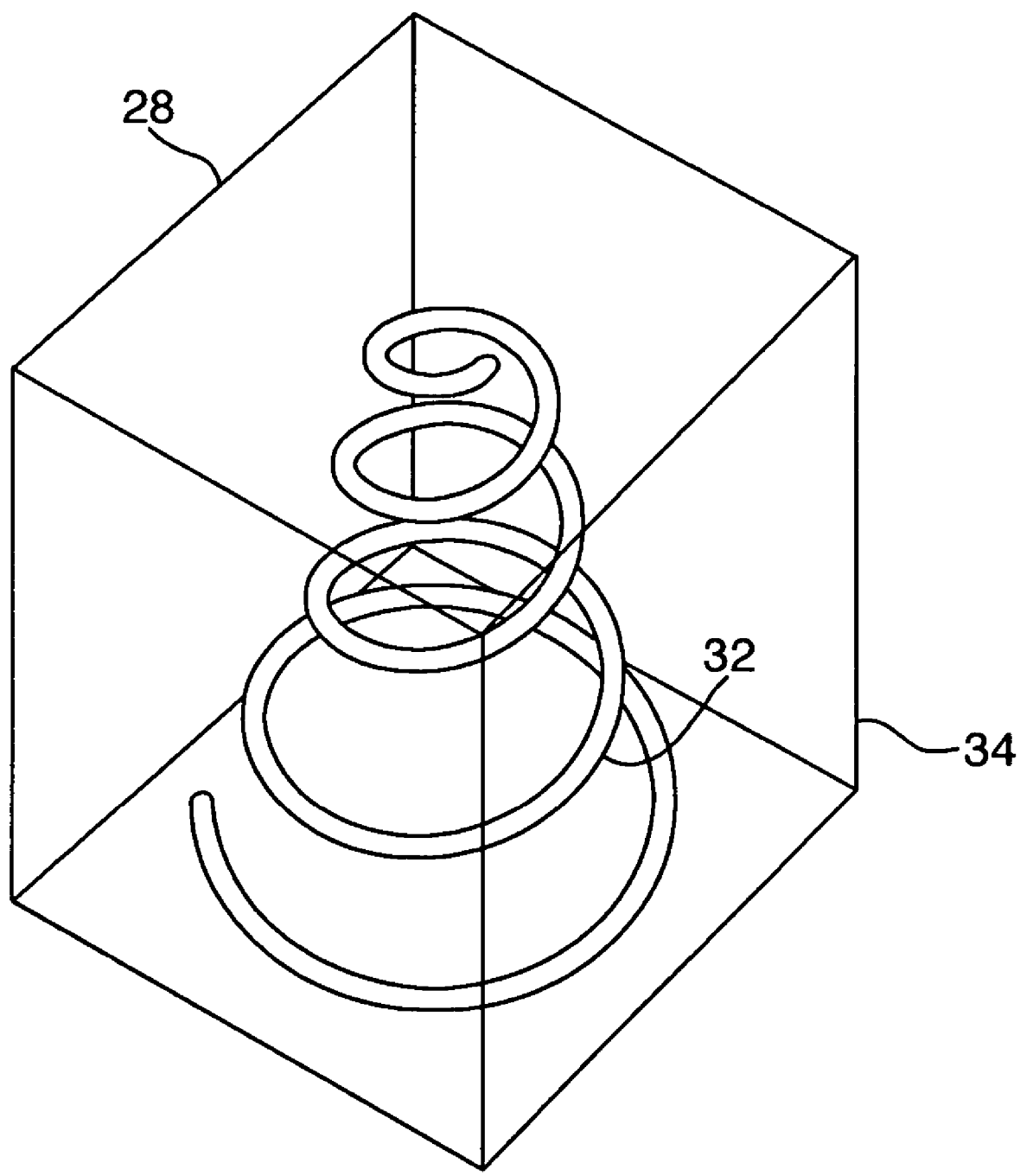
FIG. 6 is a view similar to FIG. 3 of a further embodiment of a deformable member embedded in a support material.

Referring to FIG. 6, there is shown an embodiment, in which the spring 32 is of a conical configuration. With this embodiment, the narrow end of the spring 32 is arranged adjacent to the inner layer 26, and the wider end of the spring 32 is arranged adjacent to the outer layer 36.

When the spring 32 shown in FIG. 6 is initially struck by an impactor only the narrow end deforms at first. The stiffness of the conical spring 32 shown in FIG. 6 increases as the wider end of the spring 32 deforms. This has the advantage of allowing the impact load to be transmitted gradually.

Figure 7:
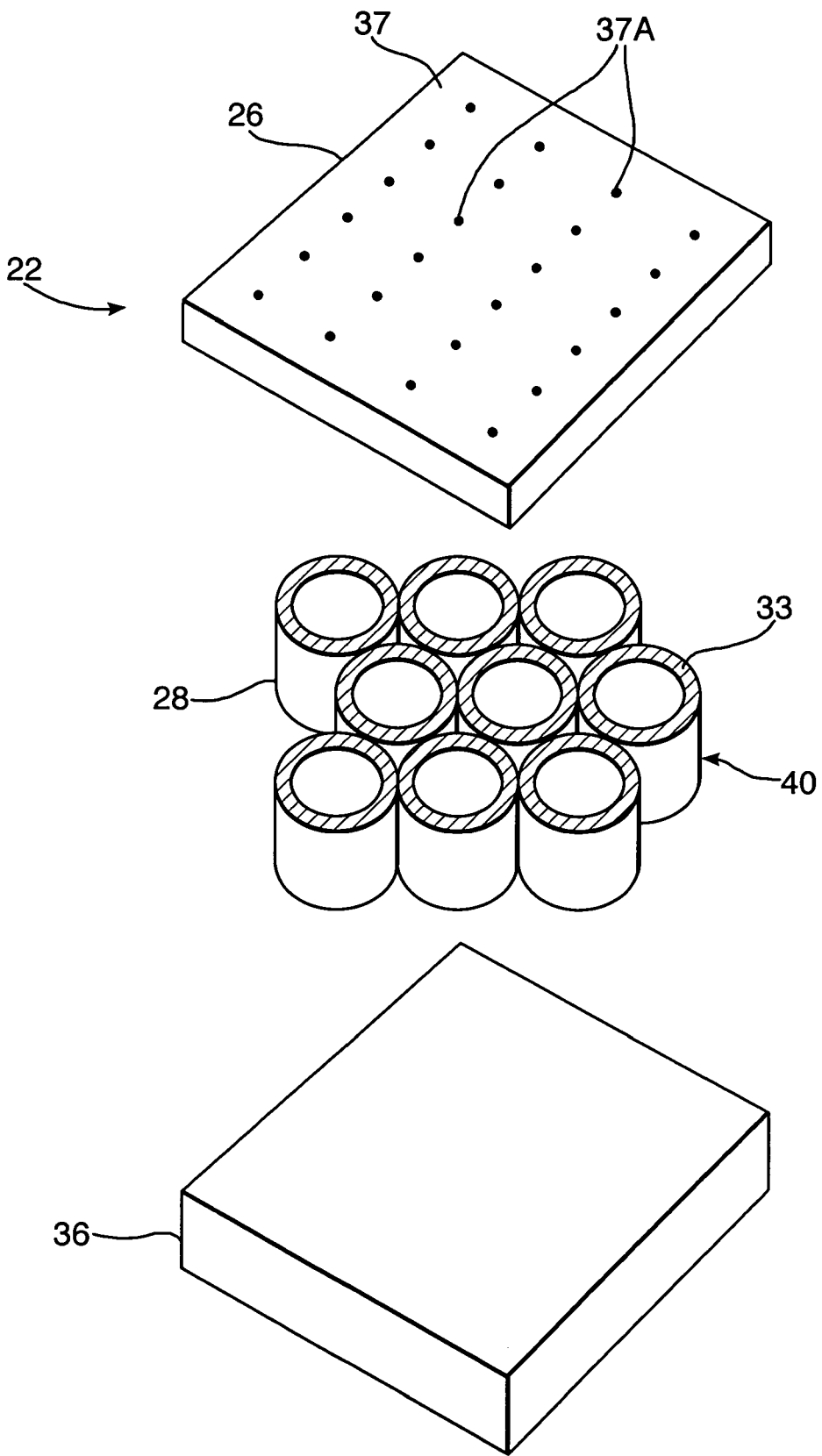
FIG. 7 is an exploded view of a further embodiment of a containment system.

FIG. 7 shows an exploded view of a further embodiment of a containment system 22, which is suitable for noise absorption. The embodiment shown in FIG. 7 comprises a first or inner layer 26, a second or middle layer 28, and a third or outer layer 36. In the event that the containment system is required to absorb noise, the first layer 26 may be perforated. The third layer 36 can be formed of the same material as described above. The second layer 28 is formed of a plurality of discrete tubes 40 of the support material 33. Each tube 40 has embedded therein a single spring 32 (see FIG. 8). The tubes 40 are arranged in an hexagonal packed array.

Figure 8:
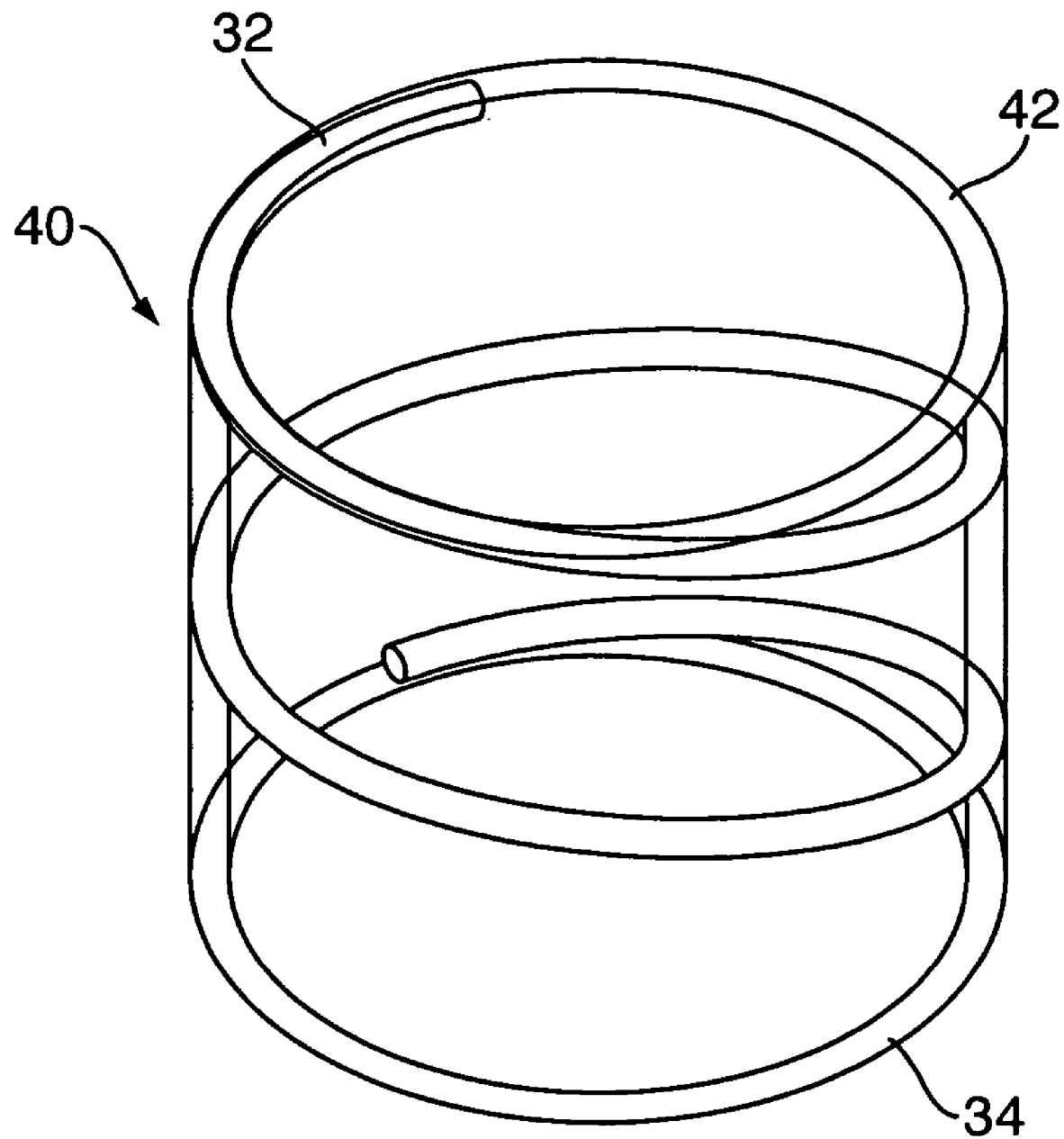
FIG. 8 is an enlarged perspective view of a deformable member suitable for use in the embodiment shown in FIG. 7.

Reference is made to FIG. 8 which shows a single cylindrical tube 40 of FIG. 7. The tube 40 is formed of a cylindrical annular wall 42 having a spring embedded in the wall 42. The tube 40 has a hollow centre around which the wall 42 and the coils of the spring 32 extend.

The first layer 26 is formed of a material 37 defining perforations 37A to enable the first layer 26 to absorb noise. The material 37 may be in the form of a sheet material to absorb noise.

The containment system 38 operates in the same way as described above. When an impactor strikes the first layer 26, it passes into the first layer 26 to strike the tubes 40 of the second layer 28. The springs 32 in the tubes 40 deform as the tubes 40 are crushed, thereby absorbing the force from the impactor. When the impactor passes through the second layer 28, it strikes the third layer 36 where the impactor halts.

In all the above embodiments, the springs 32 can be formed of metal and manufactured in the standard way of making springs as would be known in the art.

The springs 32 could alternatively be formed of carbon fibre, in which case the springs 32 could be manufactured by wrapping the carbon fibre around a mandrel and then impregnating with a resin and then curing to set the carbon fibre spring in that shape.

The springs could vary in size from of the order of $10^{-2}$ m to of the order of $10^{-9}$ m in length. In the case of springs 32 having a length which is of the order of $10^{-9}$ m, the springs 32 could be manufactured by nanotechnology methods as would be known by persons skilled in that art.

Various modifications can be made without departing from the scope of the invention. Referring to FIG. 9, there is shown a further embodiment of a containment system 22. In this embodiment, the containment system 22 comprises only two layers namely the first or inner layer 26 and the second or outer layer 28.

In this embodiment, shown in FIG. 9, the first layer 26 is generally the same as the first layer of the embodiment shown in FIG. 2. However, the second layer 28 of the embodiment shown in FIG. 9 is generally thicker than the second layer 28 of the embodiment shown in FIG. 2, and has a sufficient thickness and stiffness to contain a detached fan blade, or portion of a detached fan blade.

The second layer 28 of the embodiment shown in FIG. 9 comprises a plurality of the conical springs 32 shown in FIG. 6. The springs 32 are arranged such that they increase in stiffness in a radially outwards direction. To achieve this the conical springs 32 are arranged such that the narrow end is closest to the first layer 26 and the wider end is further from the first layer 26.

Alternatively, or in addition, stiffness of the second layer 28 can be provided by varying the density of the second layer 28 so that the density increases in a radially outwards direction. This can be achieved by increasing the proportion of hollow elements 38 adjacent to the first layer 26 and decreasing their proportion in the radially outwards direction such that, the second layer 28 becomes substantially free of the hollow elements adjacent to the radially outer face of the second layer 28.

The provision of an increased amount of the hollow elements 38 adjacent to the first layer 26 would provide a honeycomb configuration, and would have advantages associated with noise reduction.

The reduction in the proportion of hollow elements in the outward direction could be a gradual reduction or a stepwise reduction.

In the embodiment shown in FIG. 9, the containment system 22 is arranged in the gas turbine engine 10 such that the first layer 26 is closest to the axis of the gas turbine engine 10. The second layer 28 constitutes a casing member and is provided with flanges 21 or other suitable means to enable the containment system 22 to be attached to adjacent containment systems 22 to form the casing 20, or to be attached to other casings.

The casing 20 is generally cylindrical, or frustonconical, and is also arranged substantially coaxially around the fan 12, compressors 13, 14 or the turbines 16, 17 and 18. The first layer 26 is therefore arranged substantially coaxially within the second layer 28, casing 20. Again the coil springs 32 in the second layer 28 are arranged such that the axes of the coil springs 32 are arranged substantially perpendicularly to the first layer 26 and thus the axes of the coils springs 32 are arranged substantially radially relative to the axis of the casing 20 and hence the axis of rotation of the fan 12, compressors 13, 14 and turbines 16, 17 and 18.

Although the present invention has been described with reference to the use of coil springs other suitable springs may be used in the second layer providing the springs are resiliently compressible in the direction transverse to the first layer.

I claim:

1. A gas turbine engine blade containment casing comprising:
    a laminate material, the laminate material comprising a first layer and a second layer, the second layer being arranged on the first layer, and the first layer being an inner layer within the second layer;
    wherein:
        the casing is cylindrical or frustoconical; and
        the second layer comprises a plurality of resiliently compressive springs extending transversely relative to the first layer, each resiliently compressive spring being encased in a crushable support material, and axes of the springs being arranged substantially perpendicular to the first layer.

2. A gas turbine engine blade containment casing as claimed in claim 1 wherein the crushable support material comprises a matrix encasing the plurality of deformable members, the matrix extending across substantially the whole of the second layer.

3. A gas turbine engine blade containment casing as claimed in claim 1 wherein each deformable member is encased in a discrete encasing member.

4. A gas turbine engine blade containment casing as claimed in claim 3 wherein each encasing member comprising a hollow tube, each tube having an annular wall and the respective spring being embedded in the annular wall of the tube.

5. A gas turbine engine blade containment casing as claimed in claim 4 wherein the first layer is perforated.

6. A gas turbine engine blade containment casing as claimed in claim 5 wherein the tubes being arranged in an hexagonal packed array.

7. A gas turbine engine blade containment casing as claimed in claim 1 wherein the crushable support material is selected from the group comprising a polymeric material, a low density metal and a metal foam.

8. A gas turbine engine blade containment casing as claimed in claim 7 wherein the polymeric material comprises a resin material.

9. A gas turbine engine blade containment casing as claimed in claim 1 wherein the crushable support material comprises a plurality of hollow elements embedded in a polymeric material.

10. A gas turbine engine blade containment casing as claimed in claim 9 wherein the hollow elements comprise spheres of a breakable material.

11. A gas turbine engine blade containment casing as claimed in claim 10 wherein the breakable material is selected from the group comprising glass and rigid plastics material.

12. A gas turbine engine blade containment casing as claimed in claim 11 wherein the hollow elements are filled with a gas.

13. A gas turbine engine blade containment casing as claimed in claim 1 wherein the crushable support material is selected from the group comprising a foamed polymeric material and a polymeric material having a plurality of cells.

14. A gas turbine engine blade containment casing as claimed in claim 1 wherein the springs are selected from the group comprising coil springs and two-dimensional springs.

15. A gas turbine engine blade containment casing as claimed in claim 14 wherein the coil springs are selected from the group comprising a helix, a single helix, a multiple helix, and a rectangular form.

16. A gas turbine engine blade containment casing as claimed in claim 14 wherein the springs comprise coil springs, and the support material includes hollow elements, the hollow elements are arranged within the coils of the coil springs.

17. A gas turbine engine blade containment casing as claimed in claim 1 wherein the laminate material comprises a third layer arranged over the second layer, such that the second layer is provided between the first layer and the third layer.

18. A gas turbine engine blade containment casing as claimed in claim 17 wherein the third layer is formed of a rigid material to maintain structural integrity.

19. A gas turbine engine blade containment casing as claimed in claim 18 wherein the rigid material is selected from the group comprising steel and titanium.

20. A gas turbine engine blade containment casing as claimed in claim 17 wherein the first layer constitutes an inner layer, and the third layer constitutes a casing member.

21. A gas turbine engine blade containment casing as claimed in claim 20 wherein the third layer comprises connecting means to connect the third layer to a third layer of an adjacent containment system to provide a casing.

22. A gas turbine engine blade containment casing as claimed in claim 1 wherein the second layer constituting a casing member and the first layer being within the casing member, the second layer comprising connecting means to connect the second layer to a second layer of an adjacent containment system to provide a casing.

23. A gas turbine engine blade containment casing as claimed in claim 1 wherein the coil springs are conical coil springs.

24. A gas turbine engine blade containment casing as claimed in claim 23 wherein each conical coil spring has a narrower end and a wider end, the narrower ends of the conical coil springs are arranged adjacent to the first layer.

25. A gas turbine blade containment casing as claimed in claim 1 wherein the resiliently compressive springs absorb the energy of a blade impact.

26. A laminate material comprising:
a first layer; and
a second layer, the second layer being arranged on the first layer, the second layer comprising a plurality of resiliently compressive springs extending transversely relative to the first layer, each resiliently compressive spring being encased in a crushable support material;
wherein axes of the springs are arranged substantially perpendicular to the first layer.

27. A laminate material as claimed in claim 26 wherein the laminate material comprises a third layer arranged on the second layer, such that the second layer is provided between the first layer and the third layer.

28. A laminate material as claimed in claim 26 wherein the resiliently compressive springs absorb the energy of a blade impact.

* * * * *